Oct. 30, 1962 R. D. SNYDER 3,061,319
SHAFT SEAL ASSEMBLY
Filed June 24, 1959 2 Sheets-Sheet 1
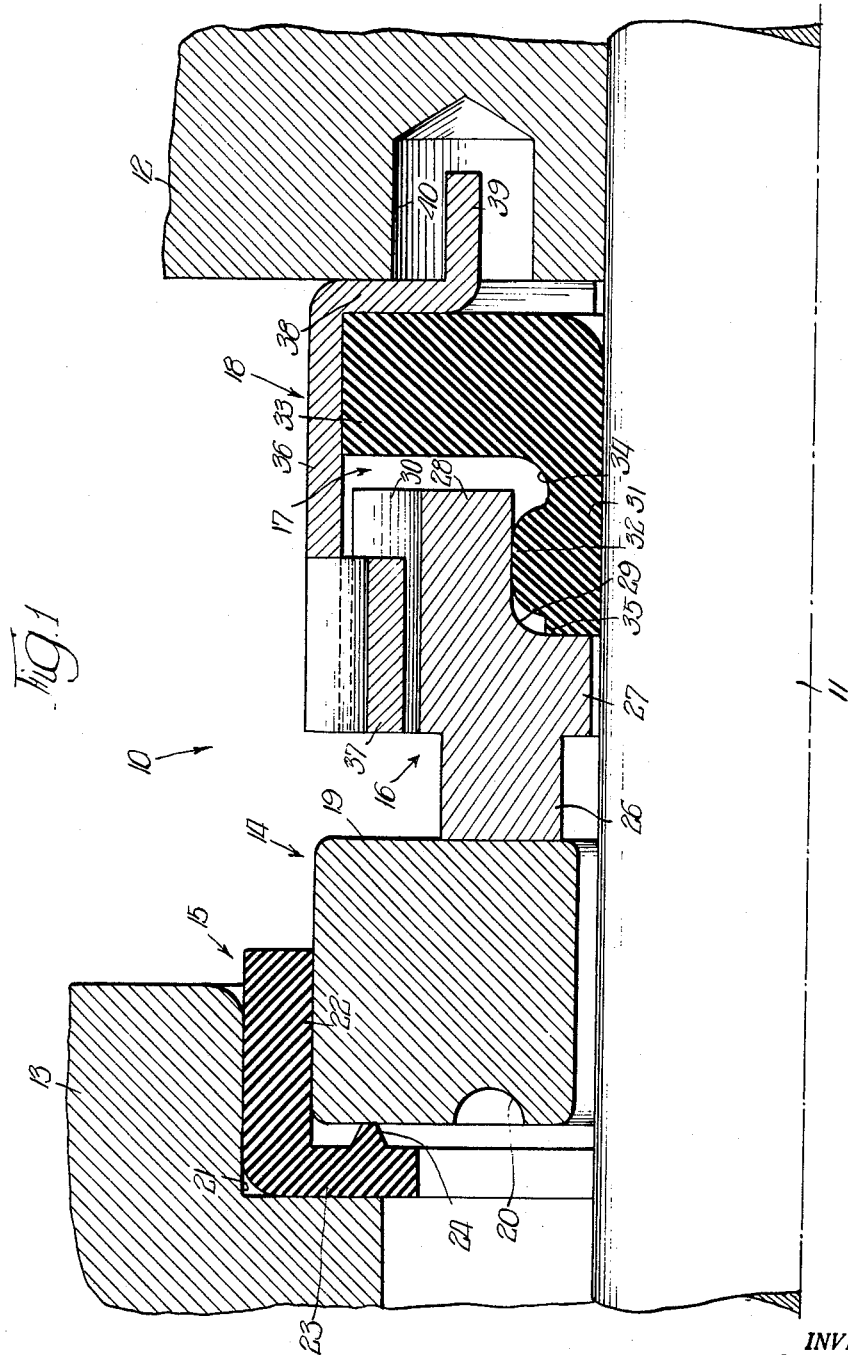
INVENTOR.
Russel D. Snyder,
BY
Cromwell, Greist + Warden
ATTYS.

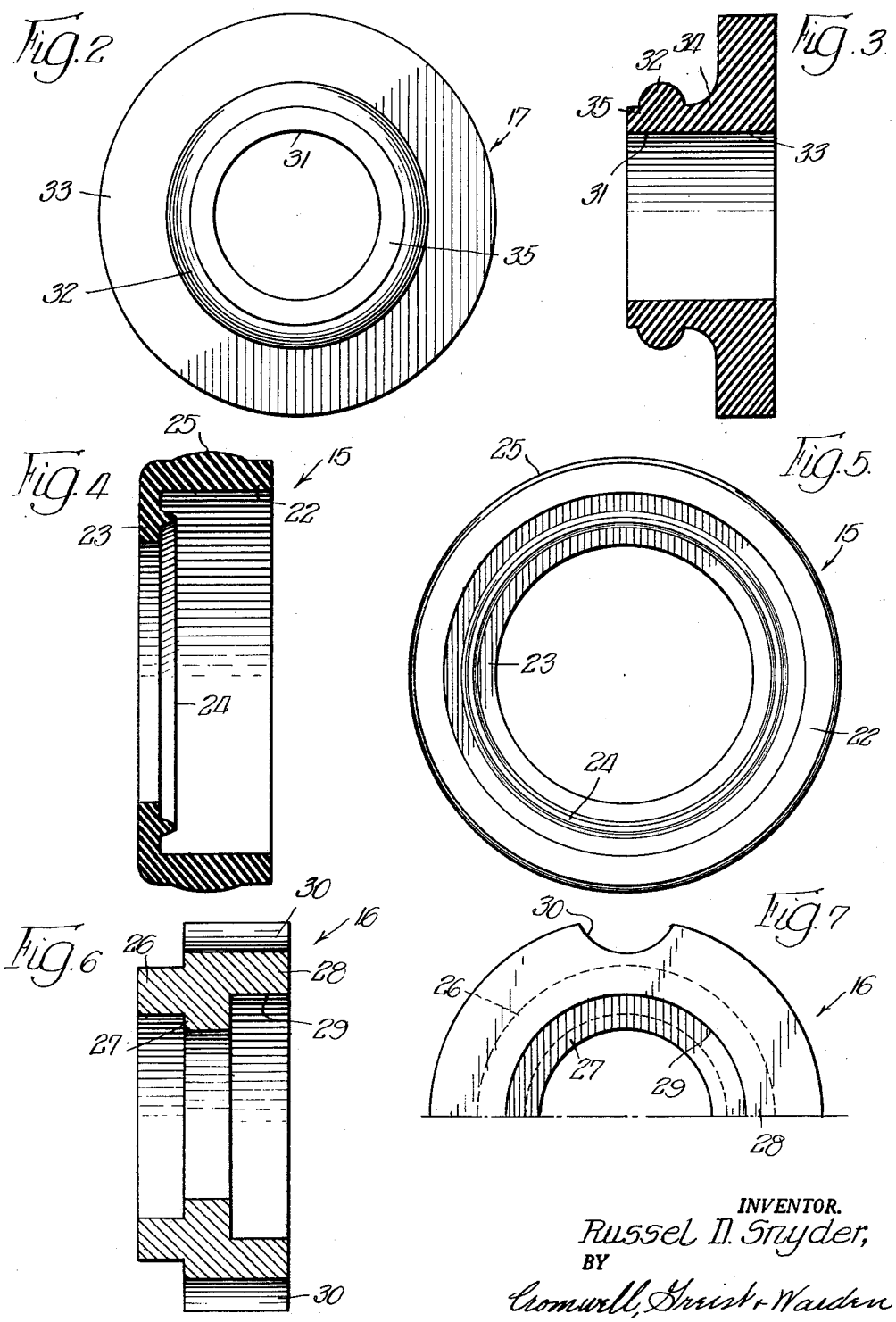

United States Patent Office 3,061,319
Patented Oct. 30, 1962

3,061,319
SHAFT SEAL ASSEMBLY
Russel D. Snyder, Chicago, Ill., assignor to Chicago Rawhide Manufacturing Company, Chicago, Ill., a corporation of Illinois
Filed June 24, 1959, Ser. No. 822,559
8 Claims. (Cl. 277—92)

The present invention relates generally to a new and improved form of running end face shaft seal assembly incorporating therein self-alignment and adjustment features providing for improved efficiency in installational mounting and operational use. More specifically, the invention is directed to a shaft seal assembly incorporating therein sealing ring members which are placed and held in end face sealing engagement with at least one of the ring members being mounted for rotation relative to the other, at least one and preferably both of the sealing ring members being mounted on means providing for resilient movement thereof in a limited universal sense to compensate for misalignment during installation and operational use.

It is an object of the present invention to provide a new and improved shaft seal assembly in which at least one of a pair of sealing ring members designed for running end face sealing engagement therebetween is resiliently mounted on means providing for adequate self-alignment and adjustment thereof relative to the other sealing ring member during installation and operational use thereof.

Still another object is to provide a new and improved shaft seal assembly including therein a mating ring and sealing ring, the mating ring being adapted for mounting in a shaft housing and the sealing ring being adapted for mounting on a shaft in running end face sealing engagement with the mating ring, the sealing ring being mounted on the shaft by a friction ring which so engages and holds the sealing ring that the same is resiliently positionable to compensate for shaft or mating ring misalignment in the installation, the friction ring further being adapted to establish and maintain a seal along the shaft as well as drive the sealing ring therewith.

Another object is to provide a new and improved form of shaft seal assembly of the type described in which the mating ring is operatively mounted in a shaft installation by resilient means providing for self-compensation in the event of installational misalignment of the mating ring relative to the shaft or shaft housing.

Other objects not specifically set forth will become apparent from the following detailed description made in conjunction with the accompanying drawings wherein:

FIG. 1 is an upper half fragmentary section of an installation including therein the new and improved shaft seal assembly of the present invention;

FIG. 2 is an end elevation on reduced scale of a friction ring forming a part of the seal assembly;

FIG. 3 is a vertical section of the friction ring of FIG. 2;

FIG. 4 is a vertical section on reduced scale of a mating ring gasket forming a part of the shaft seal assembly of FIG. 1;

FIG. 5 is an end elevation of the gasket of FIG. 4;

FIG. 6 is a vertical section on reduced scale of a mating ring forming a part of the shaft seal assembly of FIG. 1; and FIG. 7 is a top half end elevation of the mating ring of FIG. 6.

A suitable installation of the shaft seal assembly 10 of the present invention is illustrated in FIG. 1 as a part of a pump assembly including an impeller shaft 11 having fixedly mounted thereon at an end thereof an impeller 12. The shaft 11 extends into a shaft or pump housing 13 and, for purposes of explaining the operation of the seal assembly 10, the shaft 11 rotates the impeller 12 relative to the housing 13 which is fixed. The seal assembly 10 functions to seal off the area between the impeller 12 and housing 13 along the shaft and provides a running end face seal therebetween. This assembly generally includes a mating ring 14, mating ring mounting gasket 15, a sealing ring 16, a friction ring 17 and a shell member 18.

The mating ring 14 may be formed from any suitable material and the sealing face 19 thereof is lapped. In this respect, the rear face of the mating ring 14 is provided with a groove 20 to identify the same from the lapped sealing face 19 for installational purposes. The mating ring 14 is mounted in a recess 21 in the shaft housing 13 by means of the generally L-shaped gasket 15 which is in the form of a resilient means being preferably fabricated from rubber or rubber-like material. As particularly shown in FIGS. 4 and 5, the gasket 15 includes an axially extending leg portion 22 and a radially inwardly extending leg portion 23. The leg portion 22 is frictionally received over an outer rear face portion of the mating ring 14 (FIG. 1) in frictional gripping relation therewith to fixedly hold the mating ring relative to the shaft housing 13. The radial leg portion 23 extends inwardly in overlapping relation with a rear face portion of the mating ring and is spaced therefrom by reason of an annular rib-like protusion 24 integrally formed on the inner surface of the radially inwardly directed leg portion 23. The protrusion 24 is in the form of a pointed rib and is designed for axial compression engagement with the rear face of the mating ring 14 as shown in FIG. 1.

The gasket 15 is compressibly received in the recess 21 of the shaft housing 13 particularly by reason of an arcuate enlargement 25 integrally formed on the outer surface of the axially extending leg portion 22 as shown in FIGS. 4 and 5. Operative mounting of the gasket 15 in the recess 21 results in compression of the annular expansion 25 and tight frictional gripping of the gasket 15 with the adjacent surface of the shaft housing 13. Compressed frictional engagement of the leg portion 22 with the outer surface of the mating ring 14 occurs upon installational mounting of the mating ring 14 in the gasket 15 and the rib 24 holds the rear face of the mating ring 14 in spaced relation with the inner surface of the radially inwardly directed leg portion 23 of the gasket 15. With this arrangement self-adjustment and alignment of the mating ring 14 in the shaft housing 13 is made possible.

During installation, it is difficult to install the mating ring 14 so that the lapped sealing face 19 thereof is absolutely perpendicular to the shaft 11. With the presence of the annular rib 24, it is necessary merely to adequately install the mating ring 14 against displacement thereof from the shaft housing 13 and upon subsequent completion of installation of the remaining parts of the seal assembly, the mating ring 14 becomes automatically aligned or positioned within the shaft housing 13 for efficient sealing operation. In other words, the annular rib 24 provides a contact area with the mating ring 14 about which the mating ring 14 may cant or move for self-adjustment and alignment.

The sealing ring 16 as particularly shown in FIGS. 6 and 7 includes an annular, forwardly projecting sealing nose portion 26 the sealing face of which is suitably lapped for efficient sealing engagement with the sealing face 19 of the mating ring 14. The sealing ring 16 may be formed from any suitable material and further includes a central, radially inwardly projecting portion 27 which is in fairly close association with the shaft 11 but which adequately clears the same. The inner diameter of the radial portion 27 is sufficiently greater than the shaft diameter to permit tipping or limited universal movement of the sealing ring 16 relative to the shaft 11. The sealing ring 16 further includes a rearwardly projecting rib-like portion 28 spaced substantially from the shaft 11 and defining with the radially inwardly projecting portion 27 a rearwardly opening groove-like portion or recess 29. The outer surface of the sealing ring 16 is notched as at 30 to provide for a drive engagement with the shell member 18.

The friction ring 17 as shown in FIGS. 1–3 includes an axially extending portion 31 having a semi-circular protrusion 32 formed integral with the outer face thereof. The ring further includes a radially directed flange portion 33 integrally connected with the axially extending portion 31 through a relatively narrow neck portion 34. The friction ring 17 may be formed from any suitable resilient material such as natural or synthetic rubber and the like, and is dimensioned to frictionally grip the shaft 11 upon installation thereon and to be driven thereby. Upon installation, the axially extending portion 31 of the friction ring 17 is received within the recess 29 of the sealing ring 16 and the protrusion 32 is placed in compressed engagement with the inner axial surface of the recess 29, namely, the inner surface of the rearwardly projecting portion 28 of the sealing ring 16. The compressive engagement described is illustrated in FIG. 1 and it will be appreciated that with this arrangement the sealing ring 16 may be driven with the shaft 11 by the friction ring 17. Further, the semi-circular protrusion 32 being in the form of a half O-ring provides a base support for the sealing ring 16 relative to the shaft 11 about which the sealing ring 16 may universally move in a limited sense as permitted by the clearance between the inwardly projecting portion 27 thereof and the shaft 11. With this arrangement the axially extending portion 31 of the friction ring functions to seal both the shaft and the sealing ring 16 and leaves the sealing ring free to rock and follow any misalignment of the shaft in relation to the mating ring 14 or any stationary sealing face. The sealing ring 16 is thus provided with the ability to compensate for misalignment of any of the parts described by moving and rocking on the half O-ring 32 of the friction ring.

As illustrated, the axially extending portion 31 of the friction ring 17 includes an inner end portion 35 in the form of a "tail" which as shown in FIG. 1 is arranged for abutment with the inwardly projecting portion 27 of the sealing ring 16. This part of the friction ring 17 may be deleted if desired depending upon the degree of rocking or self-adjustment of the sealing ring 16 required.

The shell member 18 is of somewhat standard type and includes an axially extending wall portion 36 the inner end portion of which is provided with inwardly directed depressions or ridges 37 which are received in the drive grooves 30 of the sealing ring 16. The shell member 18 further includes a radially inwardly directed wall portion 38 extending into close association with the shaft 11 but substantially clearing the same and provided with integrally formed, rearwardly directed drive ears 39 suitably received in recesses 40 formed in the impeller 12. With this arrangement, rotation of the shaft 11 relative to the shaft housing 13 may result in a positive drive of the sealing ring 16 through the shell member 18.

The flange portion 33 of the friction ring 17 is of substantial thickness and extends from engagement with the shaft 11 into engagement with the inner annular surface of the axially extending wall portion 36 of the shell member 18. The flange portion 33 is mounted tightly on the shaft 11 to cooperate with the axially extending portion 31 and neck portion 34 to seal the shaft 11. As previously described, this tight fit not only seals the shaft but drives the sealing ring 16 resulting in the elimination of the drive connections 37 and 39 or just the drive ears 39 of the shell member 18. The flange portion 33 of the friction ring 17 is compressed within the shell member 18 and functions to back up the axially extending portion 31 and the sealing ring 16. The provision of the neck portion 34 prevents the rear face of the sealing ring 16 from initially contacting the flange portion 33 thus making sure that the sealing ring 16 may undergo self-alignment and adjustment by rocking, etc. With the lapse of time and appreciable operative use of the seal assembly, the narrow neck portion 31 of the friction ring 17 may be compressed or flow until the rear face of the sealing ring 16 contacts the flange portion 33. However, by the time that this possibility takes place, the sealing face alignment between the mating and sealing rings has already been established and the seal assembly is capable of continued efficient operational use.

It will also be appreciated that the drive ears 39 and drive recesses 40 may be dimensioned for appreciable play to utilize this drive connection as a safety drive or starting drive only. In other words, the main drive for the sealing ring 16 is supplied by the friction ring 17 whereas the drive connection including the ears 39 may be used only in the event of slight "freezing" between the sealing faces of the mating and sealing rings upon starting rotation of the shaft 11 and to prevent excessive slippage between the sealing ring 16 and friction ring 17. Any suitable arrangement may be used to maintain the sealing faces of the mating and sealing rings in operative engagement following normal wear thereof. By way of example and as is well known, a pull spring arrangement may be operative on the shaft 11. Such an arrangement is made possible by the use of a "floating" shaft 11 as is standard in many types of pumps.

While the installational use of the seal assembly 10 has been described in connection with a pump assembly, it will be understood that the application of this seal is not limited to pumps alone. Obviously, the seal assembly 10 may be applied to any unit in which it is capable of operating in the manner described. Furthermore, it will be appreciated that shaft rotation relative to a fixed shaft housing has been described merely for the purpose of illustrating one operational use of the shaft seal assembly 10.

Obviously certain modifications and variations of the invention as hereinbefore set forth may be made without departing from the spirit and scope thereof, and therefore only such limitations should be imposed as are indicated in the appended claims.

I claim:

1. A shaft seal assembly for mounting between a shaft and shaft housing one of which rotates relative to the other, said assembly including a sealing ring for running end face sealing engagement with a mating surface of said shaft housing, and a friction ring having an axially extending portion for mounting on said shaft, the exposed axial face of said friction ring having an annular semi-circular protrusion, said sealing ring being mountable on said shaft and having an axially opening groove-like portion in which the axially extending portion of said friction ring is received with the annular protrusion thereof in compressed engagement with an inner axial surface of said groove-like portion.

2. A shaft seal assembly for mounting between a shaft and shaft housing one of which rotates relative to the other, said assembly including a sealing ring and mating ring for running end face sealing engagement, means for mounting said mating ring in said shaft housing, a friction ring having an axially extending portion for mounting on said shaft, the exposed axial face of said friction ring having a semi-circular protrusion, said sealing ring being mountable on said shaft and having an axially opening groove-like portion in which the axially extending portion of said friction ring is received with the protrusion thereof in compressed engagement with an inner axial surface of said groove-like portion, and a gasket received about an outer surface portion of said mating ring in frictional gripping relation therewith and adapted for use in frictionally mounting said mating ring in said shaft housing, said gasket including a radially inwardly directed portion overlapping an outer rear face portion of said mating ring and carrying a resilient protrusion in compressed engagement with said rear face portion providing for resilient alignment of said mating ring upon mounting thereof.

3. A shaft seal assembly for mounting between a shaft and shaft housing one of which rotates relative to the other, said assembly including a sealing ring and mating ring for running end face sealing engagement, means for resiliently mounting said mating ring in said shaft housing, a friction ring having an axially extending portion for mounting on said shaft, the exposed axial face of said friction ring having an annular semi-circular protrusion, and sealing ring being mountable on said shaft and having an axially opening groove-like portion in which the axially extending portion of said friction ring is received with the annular protrusion thereof in compressed engagement with an inner axial surface of said groove-like portion, and a shell member received about said sealing ring, said shell member including means engaging said sealing ring for unitary operation therebetween and rearwardly projecting ears for engagement with a member fixed to said shaft.

4. A shaft seal assembly for mounting between a shaft and shaft housing one of which rotates relative to the other, said assembly including a sealing ring for running end face sealing engagement with a mating surface of said shaft housing, a friction ring having an axially extending portion for mounting on said shaft, the exposed axial face of said friction ring having a semi-circular protrusion, said sealing ring being mountable on said shaft and having an axially opening groove-like portion in which the axially extending portion of said friction ring is received with the protrusion thereof in compressed engagement with an inner axial surface of said groove-like portion, and a shell member received about said sealing ring, said shell member including means engaging said sealing ring for unitary operation therebetween and rearwardly projecting ears for engagement with a member fixed to said shaft, said friction ring further including a radially directed flange portion extending for engagement with said shaft and in engagement with an inner annular surface of said shell member rearwardly of said sealing ring, said flange portion being connected to said axially extending portion through an integrally formed narrow neck portion.

5. In an installation including a rotatable shaft and a fixed shaft housing having a mating ring fixedly mounted in said shaft housing, the provision of a sealing ring assembly including a sealing ring mounted about said shaft for rotation therewith, said sealing ring including a forwardly projecting sealing nose portion in running end face sealing engagement with said mating ring, a central radially inwardly projecting portion in close association with but clearing said shaft, and a rearwardly projecting rib-like portion spaced substantially from said shaft and defining with said inwardly projecting portion a rearwardly opening groove-like recess, and a friction ring mounted on said shaft in driven engagement therewith, said friction ring including an axially extending portion received in said recess and being provided on the outer axial face thereof with a semicircular protrusion which is in compressed engagement with the inner face of said rearwardly projecting portion of said sealing ring, said friction ring providing for limited universal movement of said sealing ring in said installation for effective alignment thereof with said mating ring.

6. In an installation including a rotatable shaft and a fixed shaft housing having a mating ring fixedly mounted in said shaft housing, the provision of a sealing ring assembly including a sealing ring mounted about said shaft for rotation therewith, said sealing ring including a forwardly projecting sealing nose portion in running end face sealing engagement with said mating ring, a central radially inwardly projecting portion in close association with but clearing said shaft, and a rearwardly projecting rib-like portion spaced substantially from said shaft and defining with said inwardly projecting portion a rearwardly opening groove-like recess, a friction ring mounted on said shaft in driven engagement therewith, said friction ring including an axially extending portion received in said recess and being provided on the outer axial face thereof with a semi-circular protrusion which is in compressed engagement with the inner face of said rearwardly projecting portion of said sealing ring, said friction ring providing for limited universal movement of said sealing ring in said installation for effective alignment with said mating ring, and a shell member received about said sealing ring, said shell member including drive means engaging said sealing ring for unitary operation therebetween and with said shaft and driven means engaging a part of said shaft.

7. In an installation including a rotatable shaft and a fixed shaft housing having a mating ring fixedly mounted in said shaft housing, the provision of a sealing ring assembly including a sealing ring mounted about said shaft for rotation therewith, said sealing ring including a forwardly projecting nose portion in running end face sealing engagement with said mating ring, a central radially inwardly projecting portion in close association with but clearing said shaft, and a rearwardly projecting rib-like portion spaced substantially from said shaft and defining with said inwardly projecting portion a rearwardly opening groove-like recess, a friction ring mounted on said shaft in driven engagement therewith, said friction ring including an axially extending portion received in said recess in abutment with said inwardly projecting portion of said sealing ring and being provided on the outer axial face thereof with a semi-circular protrusion which is in compressed engagement with the inner face of said rearwardly projecting portion of said sealing ring, said friction ring providing for limited universal movement of said sealing ring in said installation for effective alignment thereof with said mating ring, and a shell member received about said sealing ring, said shell member including drive means engaging said sealing ring for unitary operation therebetween and with said shaft and driven means engaging a part of said shaft, said friction ring further including a radially directed flange portion extending from engagement with said shaft into engagement with an inner annular surface of said shell member immediately rearwardly of said sealing ring, said flange portion being connected to said axially extending portion through an integrally formed narrow neck portion.

8. In an installation including a rotatable shaft and a fixed shaft housing, the provision of a shaft seal assembly including a sealing ring and mating ring mounted for running end face sealing engagement, resilient means mounting said mating ring in said housing and being substantially L-shaped in cross section with an axial leg portion thereof frictionally engaging an axial surface of said mating ring in compressed mounting between the same and a surface of said housing, the radial leg portion of said resilient means overlapping a rear face portion of said mating ring between the same and a radial surface of said housing and being provided with a resilient protrusion in compressed engagement with said rear face portion providing for resilient alignment of said mating ring with said sealing ring, said sealing ring being mounted about said shaft for rotation therewith, said sealing ring including a forwardly projecting nose portion in running end face sealing engagement with said mating ring, a central radially inwardly projecting portion in close association with but clearing said shaft, and a rearwardly projecting rib-like portion spaced substantially from said shaft and defining with said inwardly projecting portion a rearwardly opening groove-like recess, a friction ring mounted on said shaft in driven engagement therewith, said friction ring including an axially extending portion received in said recess in abutment with said inwardly projecting portion of said sealing ring and being provided on the outer axial face thereof with a protrusion which is in compressed engagement with the inner face of said rearwardly projecting portion of said sealing ring, said friction ring providing for limited universal movement of said sealing ring in said installation for effective alignment thereof with said mating ring, and a shell member received about said sealing ring, said shell member including drive means engaging said sealing ring for unitary operation therebetween and with said shaft and driven means engaging a part of said shaft, said friction ring further including a radially directed flange portion extending from engagement with said shaft into engagement with an inner annular surface of said shell member immediately rearwardly of said sealing ring, said flange portion being connected to said axially extending portion through an integrally formed narrow neck portion.

References Cited in the file of this patent

UNITED STATES PATENTS

| | | |
|---|---|---|
| 1,955,860 | Peters | Apr. 24, 1934 |
| 2,048,581 | Weiher | July 21, 1936 |
| 2,264,739 | Boden | Feb. 15, 1941 |
| 2,321,871 | Stevenson | June 15, 1943 |
| 2,341,900 | Boden | Dec. 2, 1944 |
| 2,479,698 | Schick | Aug. 23, 1949 |
| 2,525,366 | Meyer | Oct. 10, 1950 |
| 2,561,132 | Payne | July 17, 1951 |
| 2,561,884 | Perrow | July 24, 1951 |
| 2,585,154 | Montgomery | Feb. 12, 1952 |
| 2,702,203 | Sefren et al. | Feb. 15, 1955 |
| 2,710,206 | Huber | June 7, 1955 |
| 2,728,591 | Solari | Dec. 27, 1955 |
| 2,806,720 | Meyer | Sept. 17, 1957 |
| 2,884,267 | Kosatka | Apr. 28, 1959 |
| 2,884,268 | Amirault et al. | Apr. 28, 1959 |
| 2,922,668 | Haake | Jan. 26, 1960 |